United States Patent
Kawaguchi et al.

(10) Patent No.: US 9,975,739 B2
(45) Date of Patent: May 22, 2018

(54) CONTAINER YARD AND FEEDING METHOD

(71) Applicant: MITSUI ENGINEERING & SHIPBUILDING CO., LTD., Tokyo (JP)

(72) Inventors: Masaharu Kawaguchi, Oita (JP); Soshi Sato, Oita (JP); Koji Ohi, Oita (JP)

(73) Assignee: MITSUI ENGINEERING & SHIPBUILDING CO., LTD., Tokyo (JP)

( * ) Notice: Subject to any disclaimer, the term of this patent is extended or adjusted under 35 U.S.C. 154(b) by 278 days.

(21) Appl. No.: 14/766,425

(22) PCT Filed: Feb. 8, 2013

(86) PCT No.: PCT/JP2013/053063
§ 371 (c)(1),
(2) Date: Aug. 6, 2015

(87) PCT Pub. No.: WO2014/122774
PCT Pub. Date: Aug. 14, 2014

(65) Prior Publication Data
US 2016/0023866 A1 Jan. 28, 2016

(51) Int. Cl.
*B65G 63/00* (2006.01)
*B66C 13/12* (2006.01)
(Continued)

(52) U.S. Cl.
CPC ............ *B66C 13/12* (2013.01); *B65G 63/004* (2013.01); *B66C 13/26* (2013.01); *B66C 13/28* (2013.01); *H02J 3/01* (2013.01); *H02J 3/32* (2013.01)

(58) Field of Classification Search
CPC ...... B65G 63/00; B65G 63/004; B66C 13/12; B66C 13/26; B66C 13/28; H02J 3/01; H02J 3/32
(Continued)

(56) References Cited

U.S. PATENT DOCUMENTS

2011/0112731 A1* 5/2011 Harada .................... B66C 13/12
701/50

FOREIGN PATENT DOCUMENTS

CN 101877271 A 11/2010
JP 63-253827 A 10/1988
(Continued)

OTHER PUBLICATIONS

International Search Report in PCT/JP2013/053063 dated Oct. 8, 2013.
(Continued)

*Primary Examiner* — Levi Gannon
(74) *Attorney, Agent, or Firm* — Womble Bond Dickinson (US) LLC

(57) ABSTRACT

One three-phase transformer (71A) out of two paired three-phase transformers among three-phase transformers provided for respective feeder lines outputs, as operating power, first three-phase AC power of the same voltage phase as that of power-supply power. The other three-phase transformer (71B) out of the two paired three-phase transformers outputs, as the operating power, second three-phase AC power of a voltage phase shifted by $\pi/6$ from that of the power-supply power. The power storage device (4) of a crane apparatus (10) stores DC power supplied from a three-phase full-wave rectifier (1) to a common bus (B), and supplies the stored power to the common bus (B) upon reduction of the DC power.

4 Claims, 9 Drawing Sheets

(51) Int. Cl.
*B66C 13/26* (2006.01)
*B66C 13/28* (2006.01)
*H02J 3/01* (2006.01)
*H02J 3/32* (2006.01)

(58) Field of Classification Search
USPC .......................................... 212/284; 307/9.1
See application file for complete search history.

(56) References Cited

FOREIGN PATENT DOCUMENTS

| | | |
|---|---|---|
| JP | 2009023817 A | 2/2009 |
| JP | 2013-039988 A | 2/2013 |

OTHER PUBLICATIONS

"Harmonics Suppression Technical Guideline", Electro-technical Code Committee of the Japan Electric Association, JEAG 9702-1995.

* cited by examiner

CONTAINER YARD AND FEEDING METHOD

TECHNICAL FIELD

The present invention relates to a crane apparatus that performs handling of containers by power fed via a feeder line extending along a lane.

BACKGROUND ART

As a container yard where handling such as loading/unloading of containers on/from a ship or a trailer by using a crane apparatus, there is a so-called motorized container yard where power is fed from ground power equipment to a crane apparatus via a feeder line extending along a lane (see, e.g., patent literature 1).

As shown in FIG. 9, a container yard 100 is located to face a wharf 9A of a harbor. Container cranes 9C arranged at the wharf 9A load/unload containers 9 on/from a ship 9B.

The container yard 100 is divided into a plurality of handling regions, i.e., berths 7 along the wharf 9A in accordance with the arrangement position and use purpose.

In each berth 7, a plurality of lanes 72, each of which is formed from an area of a rectangular shape, when viewed from the top, extending in the longitudinal direction of the container 9, are provided as mounting places of the containers 9. Crane apparatuses 10 travel in the lanes 72 in a longitudinal direction X of the lanes 72 to efficiently sort the containers 9 mounted in the lanes 72. FIG. 9 shows an example in which the containers 9 are mounted in a direction parallel to a quay. However, the direction is not limited to this, and the containers 9 are mounted in a direction perpendicular to the quay in some cases.

Each lane 72 is equipped with a three-phase transformer 71 that supplies power to the crane apparatus 10. Power is supplied from the three-phase transformer 71 to the crane apparatus 10 via a feeder line 8 extending along the lane 72. The feeder line 8 is constituted by a trolley line (bus bar) installed on a column. A current collector mounted on the crane apparatus 10 is brought into electrical contact with the feeder line 8, and the crane apparatus 10 collects power from the three-phase transformer 71. Power receiving equipment 70 that receives commercial power and transforms its voltage is provided in each berth 7. Operating power obtained by the power receiving equipment 70 is supplied to each three-phase transformer 71 in the berth 7.

Note that the feeder line 8 is not limited to the trolley line, and a general cable reel or a cable reel carrier may be used. FIG. 9 shows an example in which the feeder lines 8 extend adjacently at adjacent ends of the two adjacent lanes 72. However, the feeder lines 8 are not limited to this and extend at identical ends individually in the respective lanes 72 in some cases.

In the container yard 100, a gate G is provided on the side of a road L. Trailers 75 pass the gate G and load/unload the containers 9.

Passages for the trailers 75 are provided in the lanes 72. The crane apparatuses 10 load/unload the containers 9 on/from the trailers 75 parked on the passages.

Although the crane apparatus 10 may be arranged in association with each lane 72, handling can be performed efficiently by moving the crane apparatus 10 to another lane 72. In this case, the crane apparatus 10 caused to perform right-angle traveling in a right-angle direction Y perpendicular to the longitudinal direction X in a turn lane 74 provided to be adjacent to the end portion of the lane 72.

Related Art Literature
Patent Literature
Patent Literature 1: Japanese Patent Laid-Open No. 2009-023817
Non-Patent Literature
Non-Patent Literature 1: "Harmonics Suppression Technical Guideline" (Electric Association Guide for Harmonics), JEAG 9702-1995, Electro-technical Code Committee of The Japan Electric Association, 3rd Edition, 15 Oct. 1995

DISCLOSURE OF INVENTION

Problem to be Solved by the Invention

In such a motorized container yard, an inverter is mounted on each crane apparatus 10. DC power obtained by AC/DC-converting power supplied from the three-phase transformer 71 via the feeder line 8 by a three-phase full-wave rectifier is further DC/AC-converted by the inverter to drive a hoist motor or travel motor constituted by an AC motor. Alternatively, a hoist motor or travel motor constituted by a DC motor is driven by driving DC power obtained by further converting the voltage of this DC power.

It is known that harmonic waves higher in frequency than the fundamental wave of commercial power are generated at the time of AC/DC conversion in the three-phase full-wave rectifier. When such harmonic waves leak at high level from the crane apparatus 10 to a commercial power system via the feeder line 8 and the three-phase transformer 71, adverse effects may be exerted on other electrical devices that use power of the commercial power system.

To prevent this, the container yard requires a harmonic wave measure to, for example, provide, in the three-phase transformer 71 or host power receiving equipment, a PWM converter or high-frequency filter that suppresses harmonic waves leaking to the commercial power system. However, the harmonic wave suppressing equipment is often a very expensive product, and large power-compliant equipment for the container yard or the like is more expensive, so the initial investment imposes a heavy burden.

The present invention has been made to solve the above problems, and has as its object to provide a crane apparatus capable of taking a harmonic wave measure effectively at low cost.

Means of Solution to the Problem

To achieve this object, according to the present invention, there is provided a container yard comprising a plurality of feeder lines extending in a mounting place of a container and configured to feed operating power to a crane apparatus which performs handling of the container, and a plurality of three-phase transformers provided for the respective feeder lines, and configured to transform a voltage of power-supply power supplied from host power supply equipment, and to supply obtained operating power to the feeder lines, wherein one of two paired three-phase transformers among the three-phase transformers is constituted by a first three-phase transformer configured to output, as the operating power, first three-phase AC power of the same voltage phase as a voltage phase of the power-supply power, and the other three-phase transformer of the two paired three-phase transformers is constituted by a second three-phase transformer configured to output, as the operating power, second three-phase AC power of a voltage phase shifted by $\alpha/6$ from the voltage phase of the power-supply power, and the crane apparatus includes a three-phase full-wave rectifier configured to perform full-wave rectification of the operating power supplied from the feeder line and to supply obtained DC power to a common bus, a motor configured to be driven based on the DC power supplied from the three-phase full-wave rectifier to the common bus and to perform hoisting and lowering of the container, and a power storage device configured to store the DC power supplied from the three-phase full-wave rectifier to the common bus and to supply the stored power to the common bus upon reduction of the DC power.

According to the present invention, there is provided a feeding method used in a container yard including a plurality of feeder lines extending in a mounting place of a container and configured to feed operating power to a crane apparatus which performs handling of the container, and a plurality of three-phase transformers that are provided for the respective feeder lines, transform a voltage of power-supply power supplied from host power supply equipment, and supply obtained operating power to the feeder lines, comprising the steps of outputting, as the operating power, first three-phase AC power of the same voltage phase as a voltage phase of the power-supply power from one three-phase transformer out of two paired three-phase transformers among the three-phase transformers, outputting, as the operating power, second three-phase AC power of a voltage phase shifted by $\pi/6$ from the voltage phase of the power-supply power from the other three-phase transformer out of the two paired three-phase transformers, and causing the crane apparatus to perform full-wave rectification of the operating power supplied from the feeder line by a three-phase full-wave rectifier, supply obtained DC power to a common bus, drive a motor configured to perform hoisting and lowering of the container based on the DC power supplied from the three-phase full-wave rectifier to the common bus, store, in a power storage device, the DC power supplied from the three-phase full-wave rectifier to the common bus, and supply the stored power to the common bus upon reduction of the DC power.

Effect of the Invention

According to the present invention, the voltage phase of operating power supplied to the crane apparatus shifts by $\pi/6$ between two paired three-phase transformers, and the fifth and seventh harmonic waves generated in the three-phase full-wave rectifier of the crane apparatus have opposite phases on the primary sides of these three-phase transformers. Thus, the fifth and seventh harmonic waves are canceled on the feeder line connected to the primary sides of these three-phase transformers.

In addition, the fluctuation of operating power consumed by the crane apparatus is suppressed by stored power from the power storage device in the crane apparatus. The level fluctuations of the fifth and seventh harmonic waves leaking to the primary sides of the two paired three-phase transformers are also suppressed and averaged.

When canceling the fifth and seventh harmonic waves on the feeder line connected to the primary sides of the three-phase transformers, the level difference between the fifth harmonic wave and the seventh harmonic wave can be reduced. The levels of the fifth and seventh harmonic waves remaining owing to the level difference between them can be lowered. As a result, the harmonic waves leaking to the commercial power system are reduced very effectively.

A harmonic wave measure can therefore be taken by only changing the connection methods of the three-phase transformers, in comparison with a case in which very expensive equipment such as a PWM converter or a high-frequency filter for suppressing harmonic waves leaking to the commercial power system is provided in the three-phase transformer or the host power receiving equipment. The three-phase transformer suffices to be a general one, and a harmonic wave measure can be taken effectively at low cost. Thus, the initial investment of the container yard can be greatly reduced.

BEST MODE FOR CARRYING OUT THE INVENTION

Embodiments of the present invention will now be described with reference to the accompanying drawings.

First Embodiment

First, a container yard 100 according to the first embodiment of the present invention will be described with reference to FIG. 1.

The container yard 100 is a facility which is located to face the wharf of a harbor and in which handling such as loading/unloading of containers on/from a ship or a trailer is performed. A handling region, i.e., a berth 7 is provided along the wharf in accordance with the arrangement position and use purpose.

Figure 1:
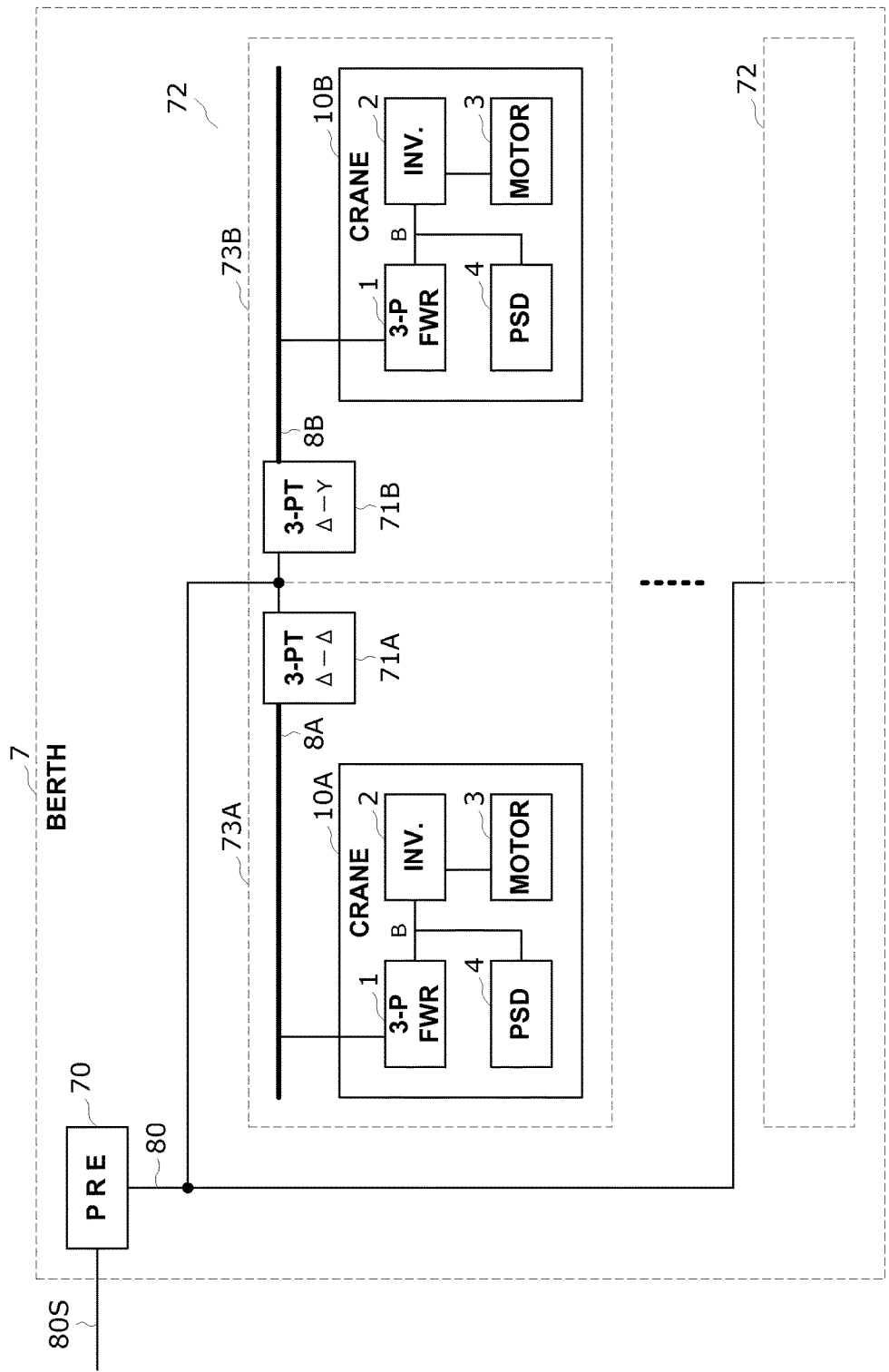
FIG. 1 is a block diagram showing the feeding arrangement of a container yard according to the first embodiment.

As shown in FIG. 1, a plurality of lanes 72, each of which is formed from an area of a rectangular shape, when viewed from the top, extending in the longitudinal direction of the container, are provided as container mounting places in the berth 7. Crane apparatuses 10 (10A and 10B) travel in the lane 72 in the longitudinal direction of the lane 72 to efficiently sort containers mounted in the lane 72.

In FIG. 1, the lane 72 is divided into two blocks 73A and 73B in the longitudinal direction. A three-phase transformer (3-PT) 71A and a feeder line 8A are provided in the block 73A, and a three-phase transformer 71B and a feeder line 8B are provided in the block 73B. With this arrangement, operating power can be fed from the center of the lane 72 to the feeder lines 8A and 8B, the average distances of the feeder lines 8A and 8B from the three-phase transformer 71 to the crane apparatuses 10 can be shortened, and the power loss on the feeder lines 8A and 8B can be suppressed.

Commercial power supplied from a commercial power system is supplied to the respective crane apparatuses 10 (10A and 10B) via the power receiving equipment (PRE) 70 provided in each berth 7 and the three-phase transformers 71 (71A and 71B) provided in each lane 72.

The power receiving equipment 70 is power supply equipment that receives commercial power supplied via a feeder line 80S, temporarily steps down the voltage by a three-phase transformer within the power receiving equipment 70, and supplies the obtained power-supply power to each lane 72 via a feeder line 80.

The three-phase transformers 71 (71A and 71B) are pieces of power supply equipment that are provided for the respective feeder lines 8 (8A and 8B) extending in the blocks (73A and 73B) of each lane 72, step down the voltage of power-supply power supplied from the power receiving equipment 70 via the feeder line 80, and supply the obtained operating power to the respective crane apparatuses 10 via the feeder lines 8 of the blocks 73.

Two three-phase transformers among the three-phase transformers 71 are paired. In the example of FIG. 1, the two three-phase transformers 71A and 71B installed in the two blocks 73A and 73B of the same lane 72 are formed into one pair.

One three-phase transformer (first three-phase transformer) 71A out of the two paired three-phase transformers is constituted by a Δ-Δ connection type or Y-Y connection type three-phase transformer. The three-phase transformer 71A has a function of outputting, as operating power, the first three-phase AC power of the same voltage phase as that of power-supply power from the power receiving equipment 70 serving as the host power supply equipment.

The other three-phase transformer (second three-phase transformer) 71B out of the two paired three-phase transformers is constituted by a Δ-Y connection type or Y-Δ connection type three-phase transformer. The three-phase transformer 71B has a function of outputting, as operating power, the second three-phase AC power of a voltage phase shifted by $\pi/6$ from that of power-supply power from the power receiving equipment 70 serving as the host power supply equipment.

The crane apparatuses 10 (10A and 10B) are crane apparatuses that perform various crane operations such as loading/unloading of cargos such as containers and traveling in the container yard 100 by driving various motors using operating power fed from the three-phase transformers 71 (71A and 71B) via the feeder lines (8A and 8B).

Each crane apparatus 10 includes, as main building components, a three-phase full-wave rectifier (3-P FWR) 1, an inverter 2, a motor 3, a power storage device (PSD) 4, and a common bus B.

The three-phase full-wave rectifiers 1 are constituted by semiconductor rectification elements such as diodes, and have a function of converting three-phase AC operating powers 11 (11A and 11B) collected from the feeder lines 8 (8A and 8B) into DC powers 12 (12A and 12B), and supplying the DC powers 12 (12A and 12B) to the common buses B.

Each motor 3 is an AC motor for performing hoisting/lowering, traversing, traveling, and the like of containers, and is provided individually in accordance with the purpose.

Each inverter 2 is a DC/AC converter that converts DC power supplied from the three-phase full-wave rectifier 1 to the common bus B into AC power, and supplies the AC power to the motor 3.

Each power storage device 4 is a circuit device that incorporates a storage battery such as a capacitor or a lithium ion battery. The power storage device 4 has a function of storing DC power supplied from the three-phase full-wave rectifier 1 to the common bus B, and when the crane apparatus 10 leaves the feeder line 8 and ground feeding is stopped at the time of lane change or the like, or when large power is consumed and DC power is reduced at the time of container hoisting or the like, supplying the stored power to the common bus.

Powers supplied to the common bus B are the DC power 12 supplied from the three-phase full-wave rectifier 1, and regenerative power supplied from the motor 3 to the common bus B via the inverter 2 at the time of cargo lowering. Of all powers supplied to the common bus B, the remaining power, i.e., surplus power except powers used by the motor 3 and other respective portions of the crane apparatus 10 is generally stored in the power storage device 4. However, surplus power obtained by limiting powers used by the respective portions of the crane apparatus 10 may be stored in the power storage device 4.

[Operation According to First Embodiment]

An operation in the container yard 100 according to this embodiment will be explained with reference to FIGS. 2 to 4.

Figure 2:
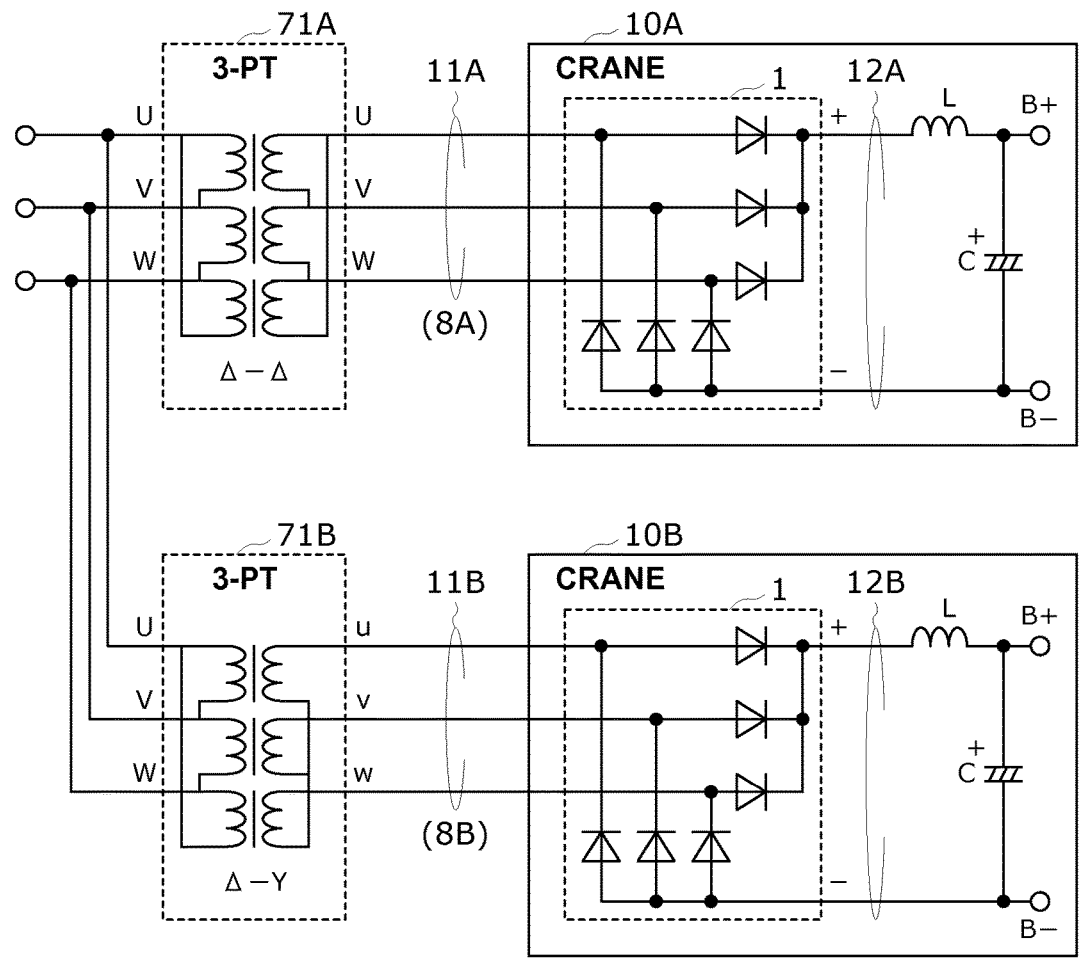
FIG. 2 is a circuit diagram showing the power system of the container yard according to the first embodiment.
Figure 3:
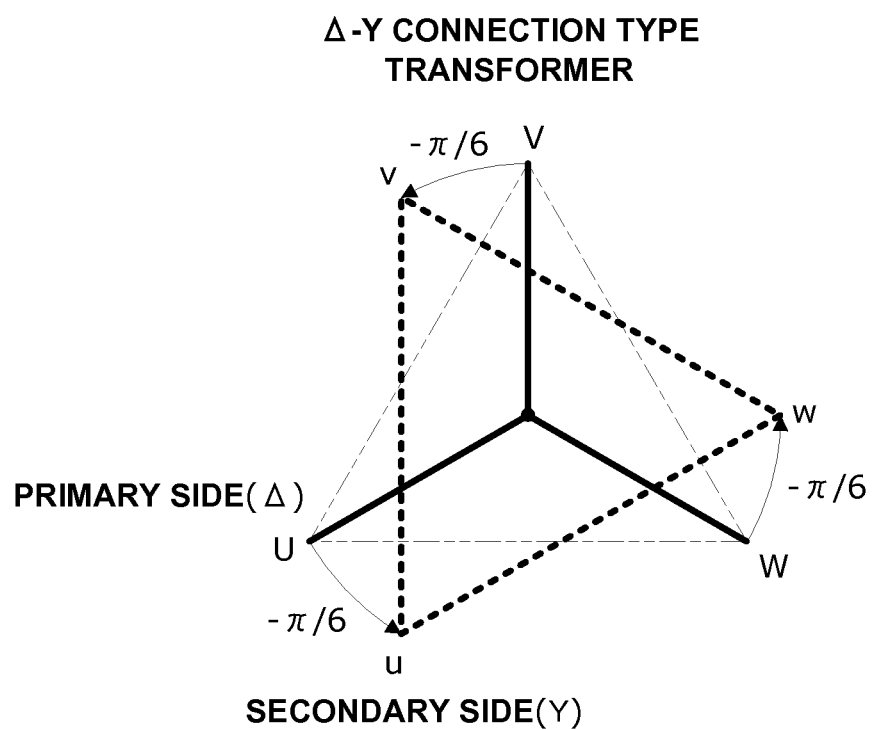
FIG. 3 is an explanatory view showing a voltage phase in a Δ-Y connection type transformer.

In the container yard 100 according to this embodiment, power-supply power supplied from the power receiving equipment 70 via the feeder line 80 is supplied to the three-phase transformers 71 (71A and 71B) installed in the respective blocks 73 (73A and 73B) of the lane 72, as shown in FIGS. 1 and 2.

The three-phase transformers 71 (71A and 71B) step down the voltages of the power-supply powers supplied to primary side windings, and supply the three-phase AC powers 11 (11A and 11B) obtained from secondary side windings as operating powers to the crane apparatuses 10 (10A and 10B) in the blocks 73 (73A and 73B) via the corresponding feeder lines 8 (8A and 8B). In the example of FIG. 2, a Δ-Δ connection type three-phase transformer is used as the three-phase transformer 71A, and a Δ-Y connection type three-phase transformer is used as the three-phase transformer 71B.

As shown in FIG. 2, the three-phase full-wave rectifier 1 of the crane apparatus 10 is constituted by a three-phase full-wave rectification bridge circuit using a diode as a rectification element.

The positive output terminal+of the three-phase full-wave rectifier 1 is connected to the positive terminal of a smoothing capacitor C via a DC reactance L. The negative output terminal—of the three-phase full-wave rectifier 1 is connected to the negative terminal of the smoothing capacitor C. The positive wire B+ and negative wire B− of the common bus B are connected to the positive terminal and negative terminal of the smoothing capacitor C.

The crane apparatus 10A uses the three-phase full-wave rectifier 1 to perform full-wave rectification of the three-phase AC power 11A supplied from the three-phase transformer 71A via the feeder line 8A. The DC power 12A output between the positive output terminal +and negative output terminal—of the three-phase full-wave rectifier 1 is smoothed by the DC reactance L and the smoothing capacitor C, and then supplied to the common bus B.

The crane apparatus 10B uses the three-phase full-wave rectifier 1 to perform full-wave rectification of the three-phase AC power 11B supplied from the three-phase transformer 71B via the feeder line 8B. The DC power 12B output between the positive output terminal +and negative output terminal—of the three-phase full-wave rectifier 1 is smoothed by the DC reactance L and the smoothing capacitor C, and then supplied to the common bus B.

As for the three-phase transformer that transforms the voltage of three-phase AC power, there are a combination of two connection methods of Δ (delta) connection and Y (star) connection regarding the primary side winding and the secondary side winding, that is, four connection types Δ-Δ, Δ-Y, Y-Δ, and Y-Y.

The Δ connection is a connection that connects the three respective phases in a direction in which a phase voltage is applied, forming a closed circuit. The end portions of three windings are series-connected into a ring shape, and the three respective phases are connected to the three connection points.

The Y connection is a connection that connects the three respective phases at a neutral point at one end. Three windings are commonly connected at one end to the neutral point, and the three respective phases are connected to the three windings at the other end.

As for the Δ-Δ connection method and Y-Y connection method out of these four types of three-phase transformers, connection methods on the primary and secondary sides are the same, so no shift is generated in the voltage phase on the primary and secondary sides. To the contrary, in the Δ-Y connection method, the voltage phase on the secondary side leads by $\pi/6$ in comparison with the primary side, as shown in FIG. 3.

Generally, when the three-phase full-wave rectifier performs full-wave rectification of three-phase AC power, a ripple in a 1/6 cycle of the fundamental wave is generated in the obtained DC voltage waveform, and higher harmonic waves mainly containing the fifth and seventh harmonic waves are generated in an AC current waveform input to the three-phase full-wave rectifier. These harmonic waves on the AC current waveform generally have a tendency to decrease the level as the order increases. More specifically, the content of each harmonic component with respect to the fundamental wave is 17.5% for the fifth harmonic wave, 11.0% for the seventh harmonic wave, 4.5% for the 11th harmonic wave, and 3.0% for the 13th harmonic wave. An effective harmonic wave measure is therefore to reduce the fifth and seventh harmonic waves of relatively high levels.

When the primary sides of the three-phase transformers 71A and 71B are parallelly connected to the feeder line 80 extending from the power receiving equipment 70, as shown in FIG. 2, the three-phase AC power 11B having a phase difference of $\pi/6$ of the fundamental wave with respect to the three-phase AC power 11A supplied from the secondary side of the three-phase transformer 71A to the three-phase full-wave rectifier 1 of the crane apparatus 10A is supplied from the secondary side of the three-phase transformer 71B to the three-phase full-wave rectifier 1 of the crane apparatus 10B.

Thus, as described in "(2) cancellation effect", pp. 88-91 in non-patent literature 1 and "3.2.1 multiple pulsing", pp. 108-120 in the same literature, the fifth harmonic wave on the primary side of the three-phase transformer 71A and the fifth harmonic wave on the primary side of the three-phase transformer 71B have opposite phases, and cancel each other on the feeder line 80 connected to the primary sides of the respective three-phase transformers 71A and 71B, lowering the level. Also, the seventh harmonic wave from the three-phase transformer 71A and the seventh harmonic wave from the three-phase transformer 71B have opposite phases, and cancel each other on the feeder line 80 connected to the primary sides of the respective three-phase transformers 71A and 71B, lowering the level. As a result, the harmonic waves leaking to the feeder line 80S, i.e., the commercial power system are suppressed.

Figure 4:
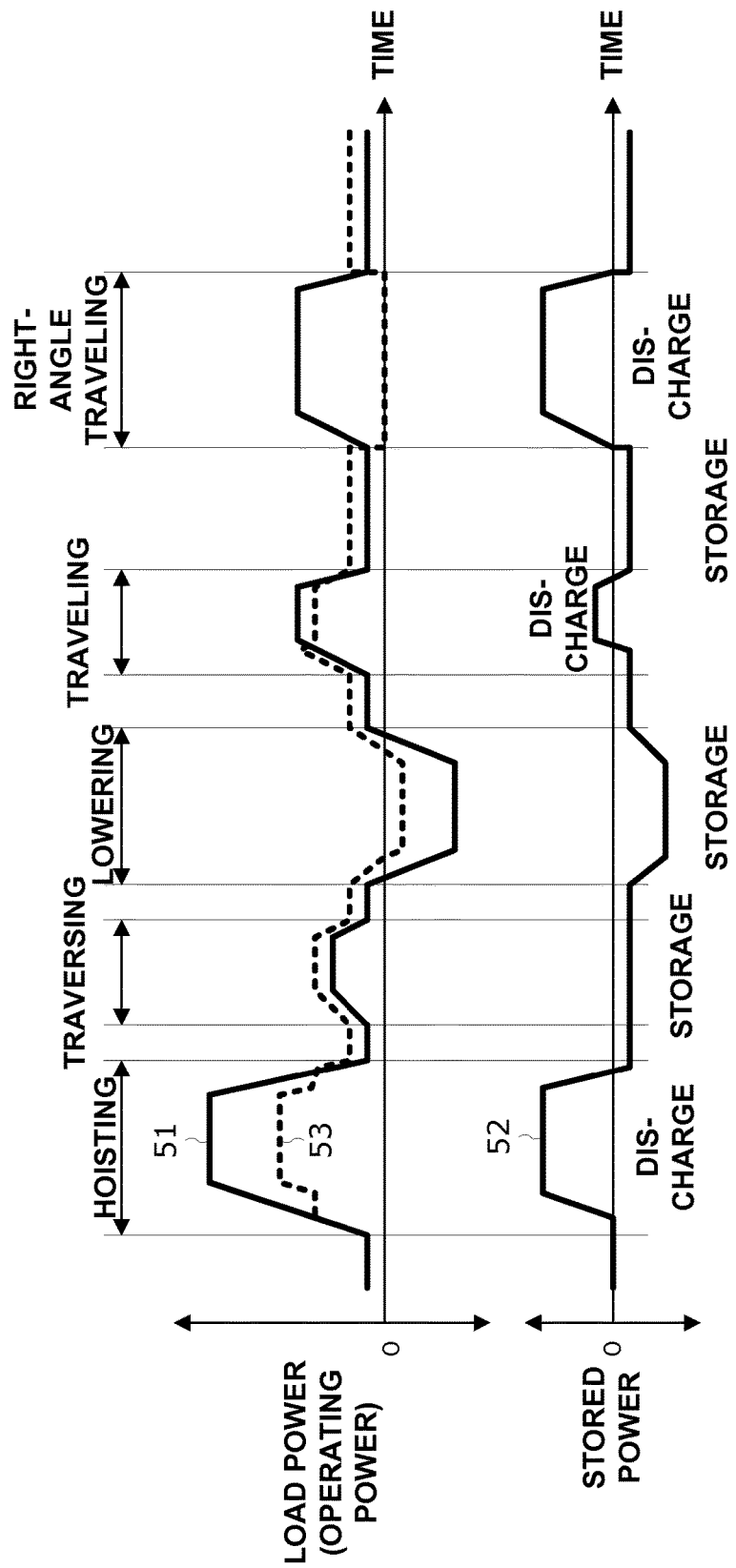
FIG. 4 is a signal waveform chart showing a change of a load in a crane apparatus.

Loads generated in the crane apparatuses 10 (10A and 10B) greatly vary depending on the contents of the crane operation, as shown in FIG. 4. In FIG. 4, a waveform 51 indicates the load of the whole crane apparatus, and a waveform 52 indicates stored power that is charged and discharged in the power storage device 4. A waveform 53 indicates operating power consumed by the whole crane apparatus.

For example, when the crane apparatus 10 hoists a container from a mounting place in the lane 72 and loads it on a trailer, a load at the time of the hoisting operation of hoisting the container is largest. The DC voltage of DC power on the common bus B drops in response to the start of the hoisting operation. When the DC voltage becomes lower than the DC voltage of power stored in the power storage device 4, the stored power of the power storage device 4 is supplied to the common bus B. This suppresses the fluctuation of the three-phase AC powers 11 (11A and 11B) that are operating powers supplied from the three-phase transformers 71 (71A and 71B) to the crane apparatuses 10 and consumed.

Similarly, the stored power of the power storage device 4 is supplied to the common bus B to suppress the fluctuation of the three-phase AC power 11 even in a traversing operation of moving, in the widthwise direction of the lane 72, a trolley on a frame from which a hoisted container is suspended, and a traveling operation of causing the crane apparatus 10 to travel in the longitudinal direction of the lane 72.

In a right-angle traveling operation of causing the crane apparatus 10 to travel at a right angle along a turn lane at the time of lane change, the crane apparatus 10 leaves the feeder line 8 (8A or 8B), so the supply of the three-phase AC power 11 is stopped, and all loads necessary at the time of right-angle traveling are supplied from the stored power of the power storage device 4.

In a lowering operation of lowering a hoisted container to a trailer or a mounting place, the motor 3 rotates by the weight of the container, and this rotation generates regenerative power. The regenerative power is inverted into DC power via the inverter 2, and the DC power is supplied to the common bus B. The DC voltage of the DC power on the common bus B rises, and when it becomes higher than the DC voltage of power stored in the power storage device 4, the DC power on the common bus B is stored as stored power in the power storage device 4.

Note that the three-phase transformer 71 always supplies the three-phase AC power 11 as operating power to the crane apparatus 10, and the DC power 12 is generated from the operating power by the three-phase full-wave rectifier 1 and supplied to the common bus B. When the crane apparatus 10 does not perform a heavy-load operation such as hoisting, traversing, traveling, or right-angle traveling, and the stored power of the power storage device decreases more than necessary, DC power on the common bus B is stored as stored power in the power storage device 4.

In this manner, when the crane apparatus 10 performs a heavy-load operation, stored power is supplied from the power storage device 4 to suppress the fluctuation of operating power, i.e., the three-phase AC power 11 supplied from the three-phase transformer 71 to the crane apparatus 10. Although the levels of the fifth and seventh harmonic waves generated in the three-phase full-wave rectifier 1 increase in accordance with an increase in operating power, the fluctuation of operating power is suppressed by stored power, and the level fluctuations of the fifth and seventh harmonic waves are suppressed. Accordingly, the level fluctuations of the fifth and seventh harmonic waves leaking from the crane apparatus 10 to the three-phase transformer 71 via the feeder line 8 are suppressed and averaged.

When canceling the fifth and seventh harmonic waves on the feeder line 80 connected to the primary side of the three-phase transformer 71, the level difference between the fifth harmonic wave and the seventh harmonic wave can be reduced. Hence, the levels of the fifth and seventh harmonic waves remaining owing to the level difference between them can be lowered, and generation of the fifth and seventh harmonic waves can be suppressed very effectively.

Effects of First Embodiment

As described above, according to the first embodiment, one three-phase transformer 71A out of the two paired three-phase transformers among the three-phase transformers 71 provided for respective feeder lines outputs, as operating power, the first three-phase AC power 11A of the same voltage phase as that of power-supply power. The other three-phase transformer 71B out of the two paired three-phase transformers outputs, as operating power, the second three-phase AC power 11B of a voltage phase shifted by π/6 from that of power-supply power. The power storage devices 4 of the crane apparatuses 10 (10A and 10B) store DC powers supplied from the three-phase full-wave rectifiers 1 to the common bus B, and supply the stored powers to the common bus B upon reduction of DC power.

Since the voltage phases of the operating powers 11A and 11B supplied to the crane apparatuses 10A and 10B shift by π/6 between the two paired three-phase transformers 71A and 71B, the fifth and seventh harmonic waves generated in the three-phase full-wave rectifiers 1 of the crane apparatuses 10A and 10B have opposite phases on the primary sides of the three-phase transformers 71A and 71B. As a result, the fifth and seventh harmonic waves are canceled on the feeder line 80 connected to the primary sides of the three-phase transformers 71A and 71B.

In addition, the fluctuation of operating power consumed by the crane apparatuses 10A and 10B is suppressed by stored powers from the power storage devices 4 in the crane apparatuses 10A and 10B. The level fluctuations of the fifth and seventh harmonic waves leaking to the primary sides of the two paired three-phase transformers 71A and 71B are also suppressed and averaged.

When canceling the fifth and seventh harmonic waves on the feeder line 80 connected to the primary sides of the three-phase transformers 71A and 71B, the level difference between the fifth harmonic wave and the seventh harmonic wave can be reduced. The levels of the fifth and seventh harmonic waves remaining owing to the level difference between them can be lowered. As a result, the harmonic waves leaking to the three-phase transformers 71 of the ground equipment, i.e., the commercial power system are reduced very effectively.

A harmonic wave measure can therefore be taken by only changing the connection methods of the three-phase transformers 71A and 71B, in comparison with a case in which very expensive equipment such as a PWM converter or a high-frequency filter for suppressing harmonic waves leaking to the commercial power system is provided in the three-phase transformers 71A and 71B or the host power receiving equipment in the container yard. The three-phase transformer suffices to be a general one, and a harmonic wave measure can be taken effectively at low cost. Thus, the initial investment of the container yard can be greatly reduced.

Further, in this embodiment, the three-phase transformers 71A and 71B arranged in the blocks 73A and 73B provided by dividing one lane 72 into two are paired. The other three-phase transformer 71B out of the two paired three-phase transformers outputs the three-phase AC power 11 of a voltage phase shifted by π/6 from that of one three-phase transformer 71A. A harmonic wave generated in the crane apparatus 10 can be canceled at a position as close as possible to the generation source of the harmonic wave. The distance by which the harmonic wave propagates through the feeder line can be shortened, and an adverse effect generated by the propagation of the harmonic wave can be minimized.

This embodiment has exemplified a case in which the motor 3 constituted by an AC motor is driven by AC power obtained by converting DC power on the common bus B by the inverter 2 in the crane apparatus 10. However, the present invention is not limited to this. Even when the motor 3 constituted by a DC motor is driven by DC power obtained by converting DC power on the common bus B by the inverter 2, this embodiment can be applied in the above-described fashion, and the same operation effects as those described above can be obtained.

Second Embodiment

A crane apparatus 10 according to the second embodiment of the present invention will be described with reference to FIGS. 5 and 6.

The first embodiment has exemplified a case in which a Δ-Y connection type three-phase transformer is used as the three-phase transformer 71B. The second embodiment will explain a case in which a Y-Δ connection type three-phase transformer is used as a three-phase transformer 71B.

Figure 5:
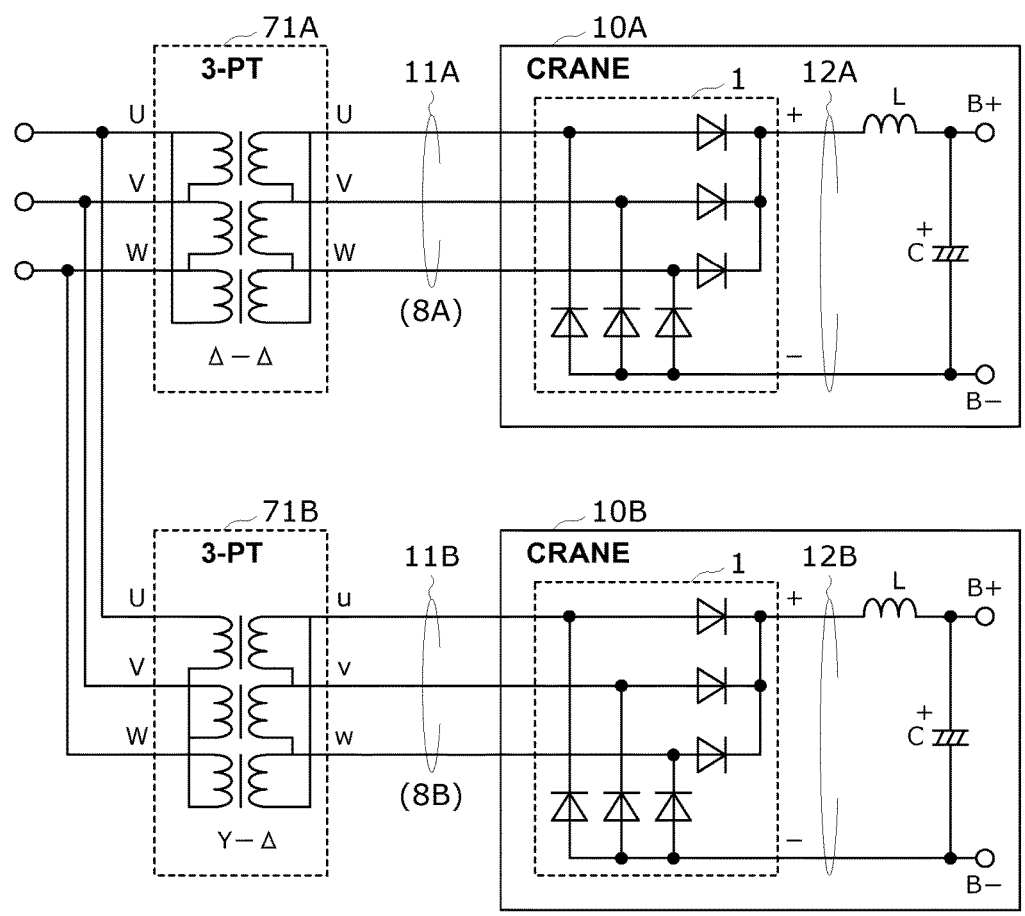
FIG. 5 is a circuit diagram showing the power system of a crane apparatus according to the second embodiment.

In a container yard 100 according to the second embodiment, as shown in FIG. 5, power-supply power supplied from power receiving equipment 70 via a feeder line 80 is supplied to three-phase transformers (71A and 71B) installed in respective blocks 73 (73A and 73B) of a lane 72, as in FIG. 1 described above.

In this embodiment, as shown in FIG. 5, a Δ-Δ connection type three-phase transformer is used as the three-phase transformer 71A, and a Y-Δ connection type three-phase transformer is used as the three-phase transformer 71B.

Figure 6:
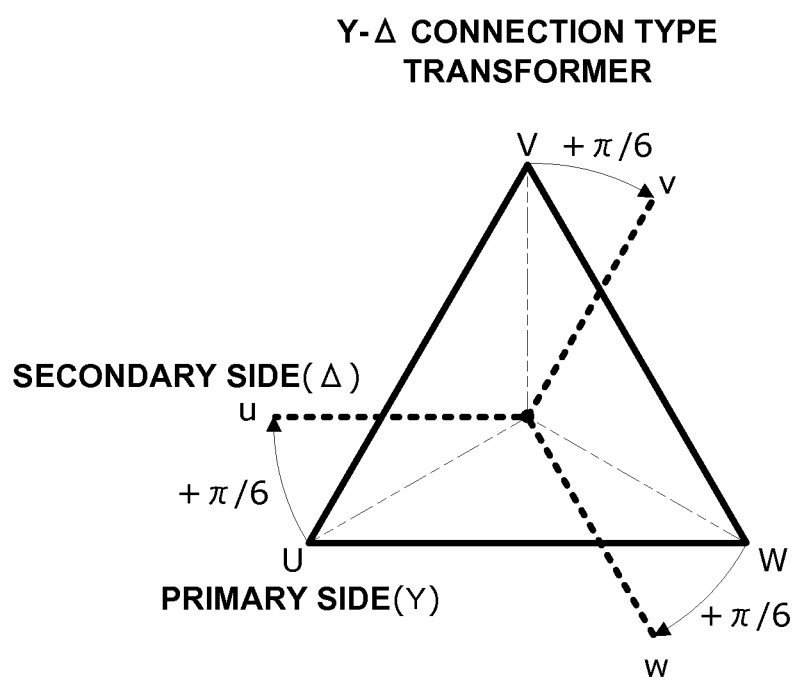
FIG. 6 is an explanatory view showing a voltage phase in a Y-Δ connection type transformer.

In the Y-Δ connection method, the voltage phase on the secondary side lags by π/6, compared to the primary side, as shown in FIG. 6. Hence, when the primary sides of the three-phase transformers 71A and 71B are parallelly connected to the feeder line 80 extending from the power receiving equipment 70, a three-phase AC power 11B having a phase difference of π/6 of the fundamental wave with respect to a three-phase AC power 11A supplied from the secondary side of the three-phase transformer 71A to a three-phase full-wave rectifier 1 of a crane apparatus 10A is supplied from the secondary side of the three-phase transformer 71B to the three-phase full-wave rectifier 1 of a crane apparatus 10B.

According to the same principle as that described in the first embodiment, the fifth harmonic wave on the primary side of the three-phase transformer 71A and the fifth harmonic wave on the primary side of the three-phase transformer 71B have opposite phases, and cancel each other on the feeder line 80 connected to the primary sides of the respective three-phase transformers 71A and 71B, lowering the level. Also, the seventh harmonic wave from the three-phase transformer 71A and the seventh harmonic wave from the three-phase transformer 71B have opposite phases, and cancel each other on the feeder line 80 connected to the primary sides of the respective three-phase transformers 71A and 71B, lowering the level. As a result, the harmonic waves leaking to a feeder line 80S, i.e., the commercial power system are suppressed.

When the crane apparatuses 10 (10A and 10B) perform a heavy-load operation, as in the first embodiment, stored powers are supplied from power storage devices 4 to suppress the fluctuation of operating powers, i.e., the three-phase AC powers 11 (11A and 11B) supplied from the three-phase transformers (71A and 71B) to the crane apparatuses 10. Although the levels of the fifth and seventh harmonic waves generated in the three-phase full-wave rectifier 1 increase in accordance with an increase in operating power, the fluctuation of operating power is suppressed by stored power, and the level fluctuations of the fifth and seventh harmonic waves are suppressed. Accordingly, the level fluctuations of the fifth and seventh harmonic waves leaking from the crane apparatus 10 to the three-phase transformer 71 via the feeder line 8 are suppressed and averaged.

When canceling the fifth and seventh harmonic waves on the feeder line 80 connected to the primary side of the three-phase transformer 71, the level difference between the fifth harmonic wave and the seventh harmonic wave can be reduced. Hence, the levels of the fifth and seventh harmonic waves remaining owing to the level difference between them can be lowered, and generation of the fifth and seventh harmonic waves can be suppressed very effectively.

Effects of Second Embodiment

As described above, the second embodiment uses a Y-Δ connection type three-phase transformer as the three-phase transformer 71B in the first embodiment. The fifth and seventh harmonic waves generated from the three-phase full-wave rectifiers 1 of the crane apparatuses 10 (10A and 10B) have opposite phases on the primary sides of the three-phase transformers 71A and 71B, and are canceled on the feeder line 80 connected to the primary sides of the three-phase transformers 71A and 71B.

In addition, the fluctuation of operating power consumed by the crane apparatuses 10A and 10B is suppressed by stored powers from the power storage devices 4. The level fluctuations of the fifth and seventh harmonic waves leaking to the primary sides of the two paired three-phase transformers 71A and 71B are also suppressed and averaged.

When canceling the fifth and seventh harmonic waves on the feeder line 80 connected to the primary sides of the three-phase transformers 71A and 71B, the level difference between the fifth harmonic wave and the seventh harmonic wave can be reduced. The levels of the fifth and seventh harmonic waves remaining owing to the level difference between them can be lowered. As a result, the harmonic waves leaking to the power receiving equipment 70, i.e., the commercial power system are reduced very effectively. The same operation effects as those in the first embodiment can be obtained.

Third Embodiment

A container yard according to the third embodiment of the present invention will be described with reference to FIG. 7.

The first and second embodiments have exemplified a case in which the three-phase transformers 71A and 71B arranged in the blocks 73A and 73B provided by dividing one lane 72 into two are paired, and the voltage phases are adjusted. The third embodiment will explain a case in which three-phase transformers 71A and 71B arranged in two adjacent lanes 72A and 72B are paired, as shown in FIG. 7, and the voltage phases are adjusted.

Figure 7:
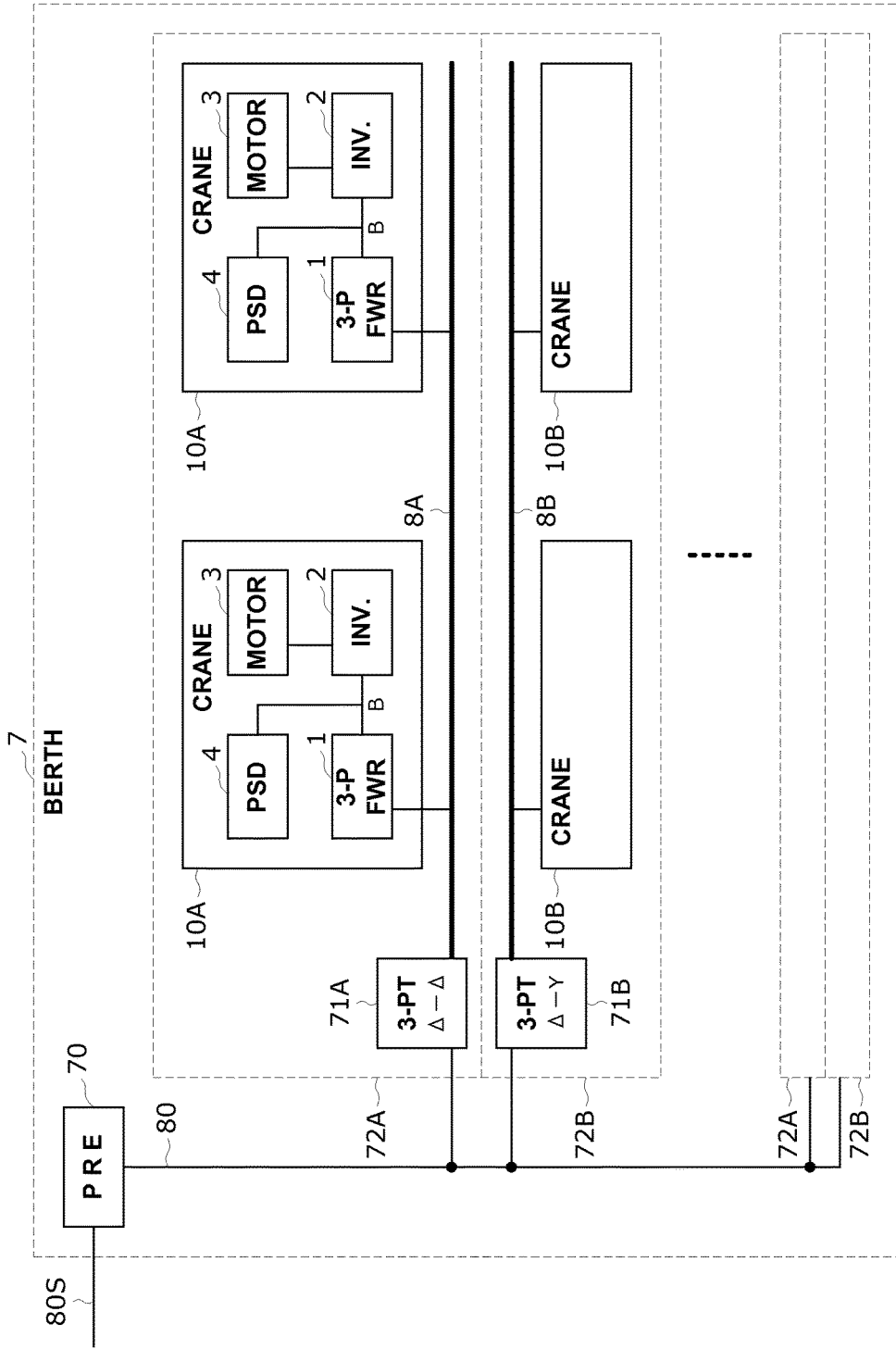
FIG. 7 is a block diagram showing the feeding arrangement of a container yard according to the third embodiment.

In the case of FIG. 7, the two three-phase transformers 71A and 71B provided in the respective adjacent lanes 72A and 72B within a berth 7 are paired and connected to power receiving equipment 70 via a feeder line 80. Commercial power is supplied from a substation to the power receiving equipment 70 via a feeder line 80S.

In this embodiment, one three-phase transformer 71A out of the two paired three-phase transformers is constituted by, e.g., a Δ-Δ connection type or Y-Y connection type first three-phase transformer that generates the first three-phase AC power of the same voltage phase as that of power-supply power from the power receiving equipment 70, and outputs the first three-phase AC power as operating power to a feeder line 8A.

Also, the other three-phase transformer 71B out of the two paired three-phase transformers is constituted by, e.g., a Δ-Y connection type or Y-Δ connection type second three-phase transformer that generates the second three-phase AC power of a voltage phase shifted by $\pi/6$ from that of power-supply power from the power receiving equipment 70, and outputs the second three-phase AC power as operating power to a feeder line 8B.

According to the same principle as that described in the first embodiment, the fifth and seventh harmonic waves generated from a crane apparatus 10A connected to the feeder line 8A of one three-phase transformer 71A, and the fifth and seventh harmonic waves generated from a crane apparatus 10B connected to the feeder line 8B of the other three-phase transformer 71B cancel each other on the feeder line 80 on the primary sides of the three-phase transformers 71A and 71B, lowering the levels.

When the crane apparatuses 10A and 10B perform a heavy-load operation, as in the first embodiment, stored powers are supplied from power storage devices 4 to suppress the fluctuation of operating powers, i.e., three-phase AC powers 11A and 11B supplied from the three-phase transformers 71A and 71B to the crane apparatuses 10A and 10B.

When canceling the fifth and seventh harmonic waves on the feeder line 80 connected to the primary sides of the three-phase transformers 71A and 71B, the level difference between the fifth harmonic wave and the seventh harmonic wave can be reduced. Hence, the levels of the fifth and seventh harmonic waves remaining owing to the level difference between them can be lowered, and generation of the fifth and seventh harmonic waves can be suppressed very effectively.

Figure 8:
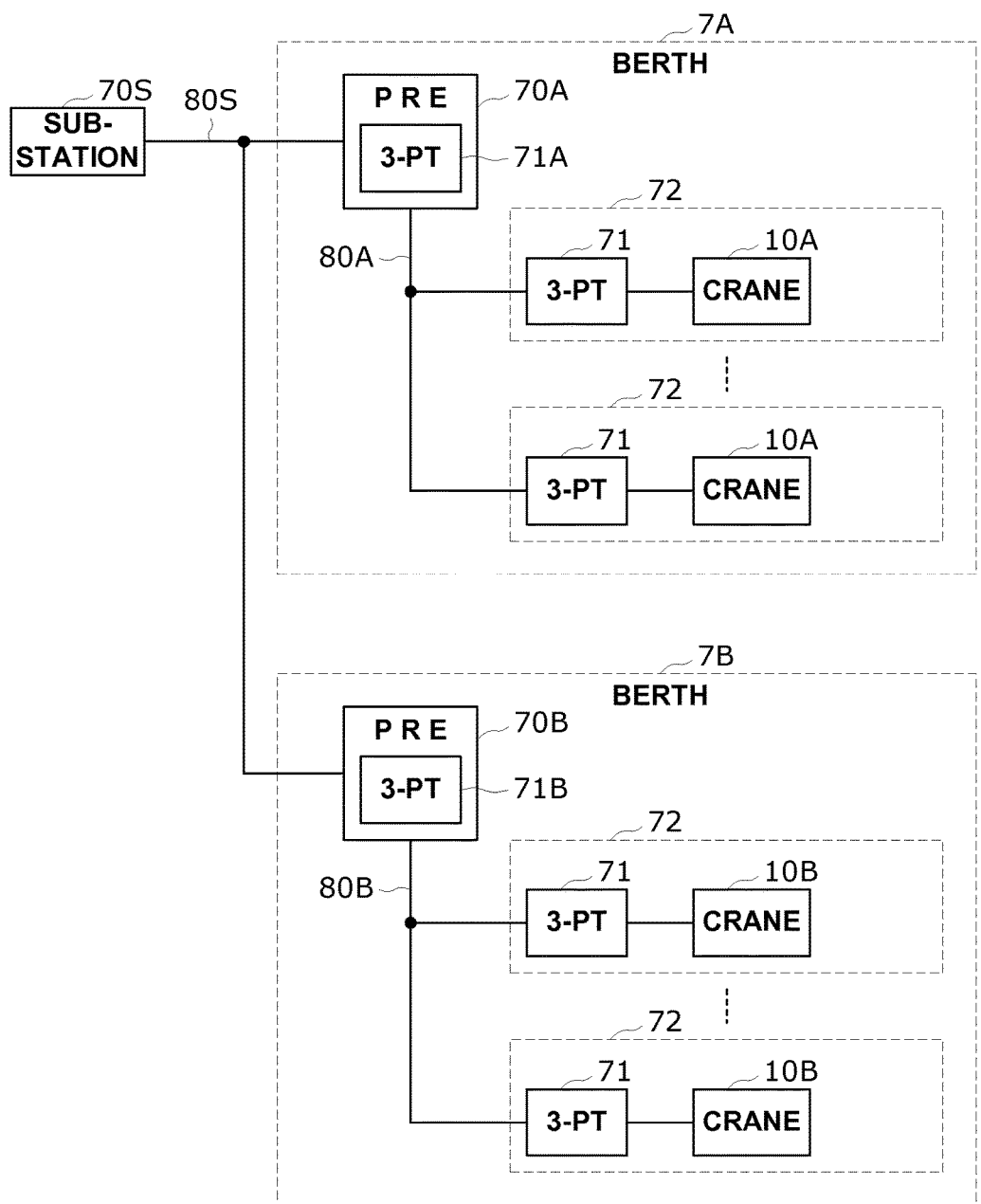
FIG. 8 is a block diagram showing the feeding arrangement of another container yard according to the third embodiment.
Figure 9:
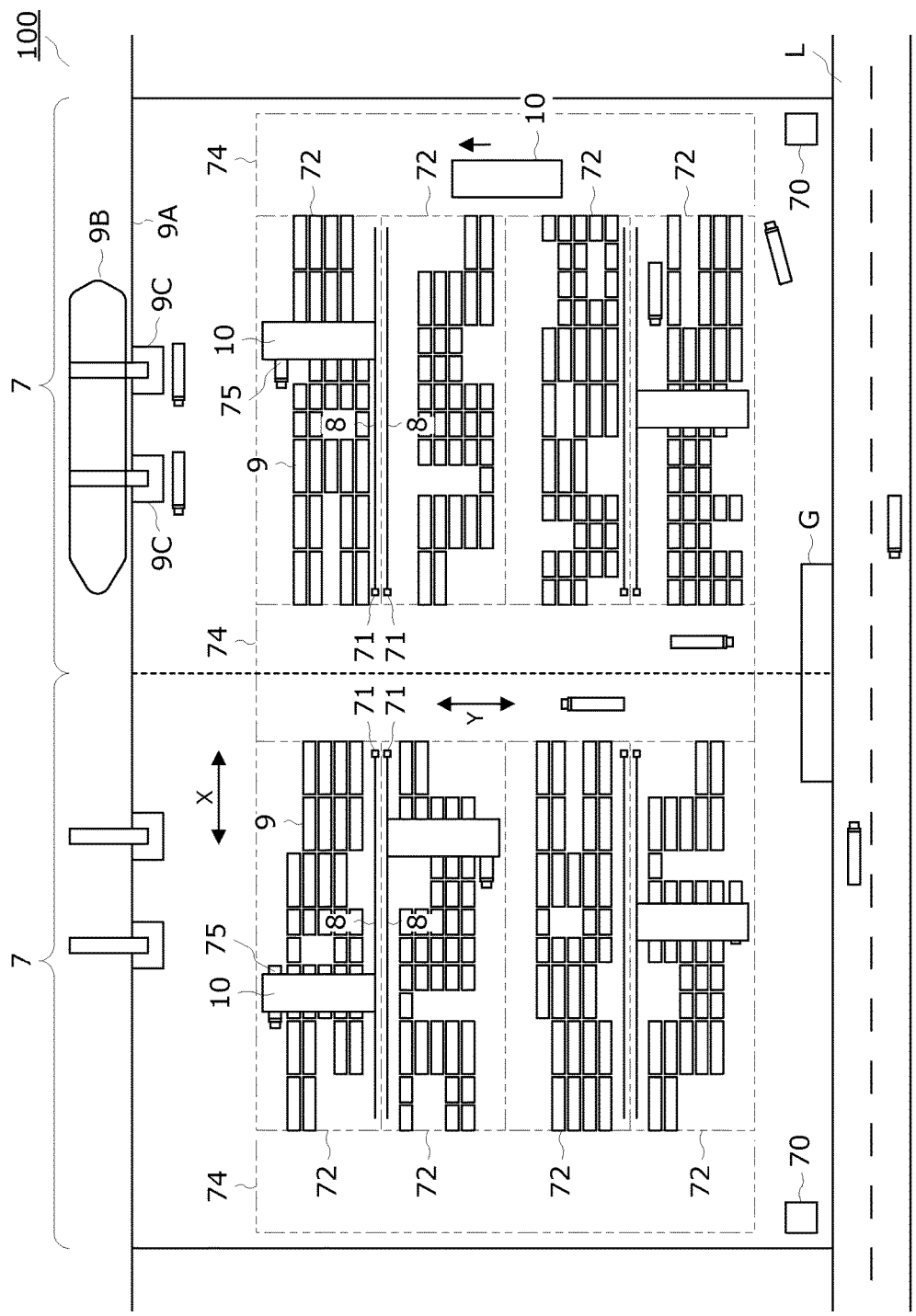
FIG. 9 is a plan view showing an example of the arrangement of a general container yard.

The two paired three-phase transformers 71 are not limited to those provided on the two lanes 72. In the example of FIG. 8, pieces of power receiving equipment 70A and 70B are provided in two respective berths 7A and 7B provided by dividing a container yard 100. The pieces of power receiving equipment 70A and 70B incorporate the three-phase transformers 71A and 71B, respectively, for stepping down the voltage of power-supply power fed at high voltage from substation equipment 70S via the feeder line 80S.

The three-phase transformer 71A of one power receiving equipment 70A is constituted by, e.g., a Δ-Δ connection type or Y-Y connection type first three-phase transformer that generates the first three-phase AC power of the same voltage phase as that of power-supply power from the substation equipment 70S, and supplies the first three-phase AC power as operating power to a feeder line 80A.

Also, the three-phase transformer 71B of the other power receiving equipment 70B is constituted by, e.g., a Δ-Y connection type or Y-Δ connection type second three-phase transformer that generates the second three-phase AC power of a voltage phase shifted by π/6 from that of power-supply power from the substation equipment 70S, and supplies the second three-phase AC power as operating power to a feeder line 80B.

According to the same principle as that described in the first embodiment, the fifth and seventh harmonic waves generated from the crane apparatus 10A connected to the feeder line 80A of one power receiving equipment 70A, and the fifth and seventh harmonic waves generated from the crane apparatus 10B connected to the feeder line 80B of the other power receiving equipment 70B cancel each other on the feeder line 80S on the primary sides of the pieces of power receiving equipment 70A and 70B, lowering the levels.

In addition, the fluctuation of operating power consumed by the crane apparatuses 10A and 10B is suppressed by stored powers from the power storage devices 4 in the crane apparatuses 10A and 10B. The level fluctuations of the fifth and seventh harmonic waves leaking to the primary sides of the two paired pieces of power receiving equipment 70A and 70B are also suppressed and averaged.

The levels of the fifth and seventh harmonic waves remaining owing to the level difference between them can be lowered. As a result, the harmonic waves leaking to the substation equipment 70S, i.e., the commercial power system are reduced very effectively.

Effects of Third Embodiment

As described above, of the three-phase transformers that are provided for respective feeder lines in the container yard 100, transform the voltage of power-supply power supplied from host power supply equipment, and supply the obtained operating power to the feeder lines, one three-phase transformer 71A out of the two paired three-phase transformers outputs, as operating power, the first three-phase AC power of the same voltage phase as that of power-supply power. The other three-phase transformer 71B out of the two paired three-phase transformers outputs, as operating power, the second three-phase AC power of a voltage phase shifted by π/6 from that of power-supply power.

In addition, the fluctuation of operating power consumed by the crane apparatuses 10A and 10B is suppressed by stored powers from the power storage devices 4. Therefore, the level fluctuations of the fifth and seventh harmonic waves leaking to the primary sides of the two paired three-phase transformers 71A and 71B are also suppressed and averaged.

When canceling the fifth and seventh harmonic waves on the feeder line connected to the primary sides of the three-phase transformers 71A and 71B, the level difference between the fifth harmonic wave and the seventh harmonic wave can be reduced. The levels of the fifth and seventh harmonic waves remaining owing to the level difference between them can be lowered. As a result, the harmonic waves leaking to the host electrical equipment, i.e., the commercial power system are reduced very effectively. The same operation effects as those in the first embodiment can be obtained.

Extension of Embodiments

The present invention has been described above by referring to the embodiments, but is not limited to these embodiments. Various changes understandable by those skilled in the art can be made for the arrangements and details of the present invention without departing from the scope of the invention. In addition, the embodiments can be arbitrarily combined and implemented within a consistent range.

EXPLANATION OF THE REFERENCE NUMERALS AND SIGNS

100 . . . container yard, 10, 10A, 10B . . . crane apparatus, 1 . . . three-phase full-wave rectifier, 11 . . . three-phase AC power, 11A . . . three-phase AC power (first three-phase AC power), 11B . . . three-phase AC power (second three-phase AC power), 12, 12A, 12B . . . DC power, 2 . . . inverter (INV), 3 . . . motor, 4 . . . power storage device, 7, 7A, 7B . . . berth, 70, 70A, 70B . . . power receiving equipment, 70S . . . substation equipment, 71 . . . three-phase transformer, 71A . . . three-phase transformer (first three-phase transformer), 71B . . . three-phase transformer (second three-phase transformer), 72, 72A, 72B . . . lane, 73, 73A, 73B . . . block, 74 . . . turn lane, 8, 8A, 8B, 80, 80A, 80B, 80S . . . feeder line, 9 . . . container, B . . . common bus

The invention claimed is:

1. A container yard comprising:
    a plurality of feeder lines extending in a mounting place of a container and configured to feed operating power to a crane apparatus which performs handling of the container; and
    a plurality of three-phase transformers provided for the respective feeder lines, and configured to transform a voltage of power-supply power supplied from host power supply equipment, and to supply obtained operating power to the feeder lines,
    wherein one of two paired three-phase transformers among the three-phase transformers is constituted by a first three-phase transformer configured to output, as the operating power, first three-phase AC power of the same voltage phase as a voltage phase of the power-supply power, and the other three-phase transformer of the two paired three-phase transformers is constituted by a second three-phase transformer configured to output, as the operating power, second three-phase AC power of a voltage phase shifted by π/6 from the voltage phase of the power-supply power, and
    the crane apparatus includes a three-phase full-wave rectifier configured to perform full-wave rectification of the operating power supplied from the feeder line and to supply obtained DC power to a common bus, a motor configured to be driven based on the DC power supplied from the three-phase full-wave rectifier to the common bus and to perform hoisting and lowering of the container, and a power storage device configured to store the DC power supplied from the three-phase full-wave rectifier to the common bus and to supply the stored power to the common bus upon reduction of the DC power.

2. The container yard according to claim 1, wherein the first three-phase transformer is constituted by a three-phase transformer of one of a Δ-Δ connection type and a Y-Y connection type, and the second three-phase transformer is constituted by a three-phase transformer of one of a Δ-Y connection type and a Y-Δ connection type.

3. A feeding method used in a container yard including a plurality of feeder lines extending in a mounting place of a container and configured to feed operating power to a crane apparatus which performs handling of the container, and a plurality of three-phase transformers provided for the respective feeder lines, and configured to transform a voltage of power-supply power supplied from host power supply equipment and to supply obtained operating power to the feeder lines, comprising the steps of:

outputting, as the operating power, first three-phase AC power of the same voltage phase as a voltage phase of the power-supply power from a first three-phase transformer that is one of two paired three-phase transformers among the three-phase transformers;

outputting, as the operating power, second three-phase AC power of a voltage phase shifted by $\pi/6$ from the voltage phase of the power-supply power from a second three-phase transformer that is the other three-phase transformer of the two paired three-phase transformers; and causing the crane apparatus to perform full-wave rectification of the operating power supplied from the feeder line by a three-phase full-wave rectifier, supply obtained DC power to a common bus, drive a motor configured to perform hoisting and lowering of the container based on the DC power supplied from the three-phase full-wave rectifier to the common bus, store, in a power storage device, the DC power supplied from the three-phase full-wave rectifier to the common bus, and supply the stored power to the common bus upon reduction of the DC power.

4. The feeding method according to claim 3, wherein the first three-phase transformer is constituted by a three-phase transformer of one of a Δ-Δ connection type and a Y-Y connection type, and the second three-phase transformer is constituted by a three-phase transformer of one of a Δ-Y connection type and a Y-Δ connection type.

* * * * *